United States Patent [19]

Nasser et al.

[11] Patent Number: 5,443,276
[45] Date of Patent: Aug. 22, 1995

[54] SELF-LOCKING BLADE HOLDER

[75] Inventors: Edward A. Nasser; Manfred Staebler, both of New Bern, N.C.

[73] Assignee: S-B Power Tool Company, Chicago, Ill.

[21] Appl. No.: 279,052

[22] Filed: Jul. 22, 1994

[51] Int. Cl.[6] .............................................. B27B 19/02
[52] U.S. Cl. ....................................... 279/77; 30/392; 83/699.21
[58] Field of Search ................... 279/29, 77, 904, 906; 403/330, 343; 30/392–394, 337–339; 83/699.21

[56] References Cited

U.S. PATENT DOCUMENTS 4,601,477  7/1986  Barrett et al. ..................... 279/906
5,322,302  6/1994  Quirijnen ............................ 279/77

Primary Examiner—Steven C. Bishop
Attorney, Agent, or Firm—Jones, Day, Reavis & Pogue

[57] ABSTRACT

The reciprocating plunger of a power tool has a planar surface for substantial co-extensive engagement with one side of the mounting portion of plural ones of blades of varying thicknesses. A housing mounted to the plunger includes a cavity and rotatably supports a cam block in the cavity. The cam block has an arcuate cam face establishing respective plural axial lines of contact with the other side of the mounting portion of ones of the blades of varying thicknesses. Each of the lines of contact occupies an over-center relationship with respect to a plane perpendicular to the blade and containing the axis of rotation of the cam block.

3 Claims, 2 Drawing Sheets

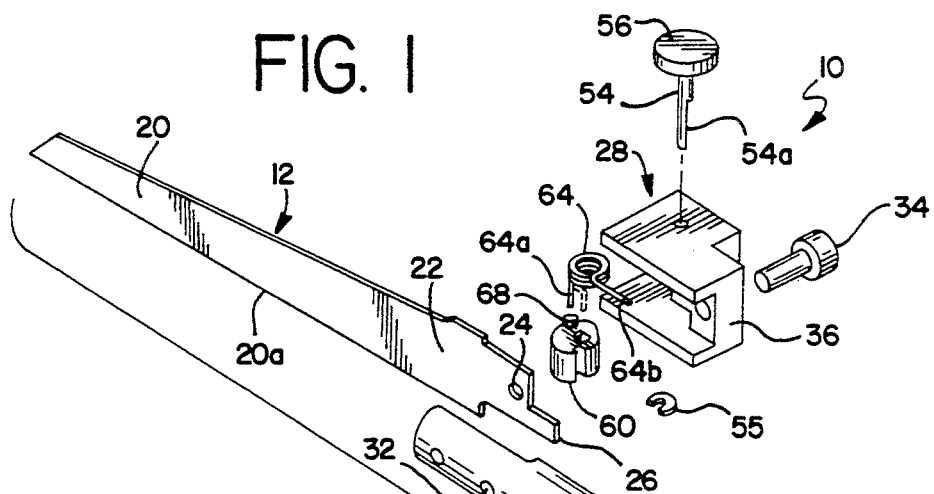
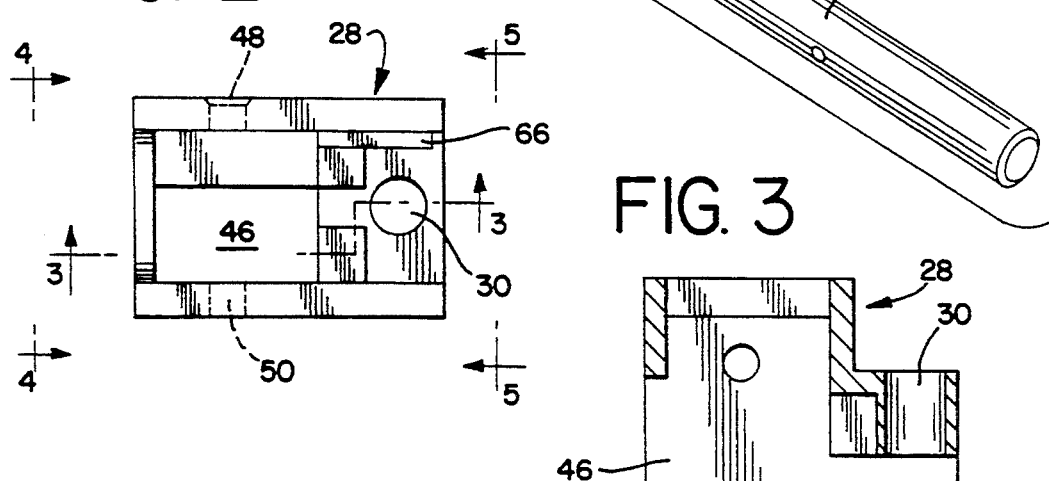
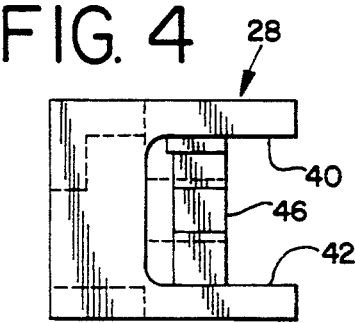
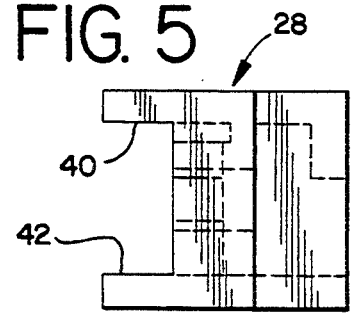

SELF-LOCKING BLADE HOLDER

The present invention relates to a mechanism for holding a saw blade to the reciprocating plunger of a tool, such as a power tool. More particularly, the present invention relates to a self-locking, quick-release blade holder which will accommodate blades of varying thicknesses.

BACKGROUND OF THE INVENTION

Saw blades of the type under consideration have a planar cutting portion with teeth extending along one edge of the blade from the outer end thereof. These blades also have an integral co-planar mounting portion with an aperture adjacent the inner end of the blade. Typically, the reciprocating plunger of a power tool which will utilize blades of this type includes an opening or cavity to receive the mounting portion of a selected blade. Normally the plunger includes a short cylindrical projection which extends into the cavity for interengagement with the aforementioned blade aperture. Conventional blade holders of the type under consideration use a set screw for tightly clamping the blade to the tool plunger. Of course, tightening of the set screw requires use of a separate tool, such as a screwdriver or Allen wrench.

Other forms of blade holders are shown in U.S. Pat. Nos. 4,106,181, 4,601,477, 5,103,565 and Ser. No. 098,710, filed Jul. 28, 1993, now U.S. Pat. No. 5,322,302. The devices shown in these patents are either overly complicated or are not adapted to handle blades of varying thicknesses.

SUMMARY OF THE INVENTION

The present invention relates to a self-locking blade holder which permits a blade to be quickly mounted to and disengaged from the tool plunger without the aid of a separate tool. The invention provides a self-locking feature in that the blade may be mounted in place simply by inserting the mounting portion of the blade in a cavity for engagement with a cam block. The blade may be quickly released by manual operation of an actuator forming part of the blade holder assembly. Further, the blade holder assembly of the present invention accommodates blades of varying thicknesses. Still further, the blade holder assembly of the present invention is not of complicated construction and thus lends itself to inexpensive manufacture. These and other objects and advantages of the invention will become apparent from the following specification.

DESCRIPTION OF THE DRAWINGS

FIG. 1 is an exploded isometric view of the blade holder assembly of the present invention;

FIG. 2 is an enlarged side view of a housing forming part of the blade holder assembly;

FIG. 3 is a section taken along the line 3—3 of FIG. 2;

FIG. 4 is an end view as seen along the line 4—4 of FIG. 2;

FIG. 5 is an end view as seen taken along the line 5—5 of FIG. 2;

DESCRIPTION OF THE INVENTION

Figure 6:
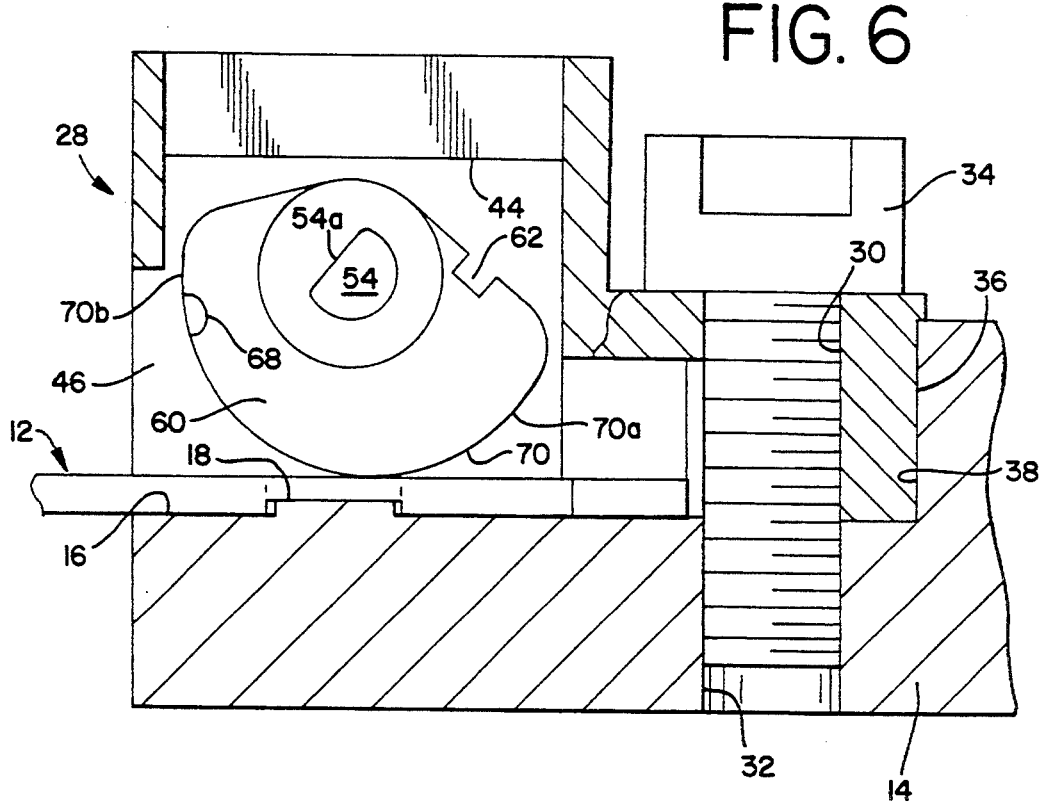
FIG. 6 is an enlarged partial section and partial top view showing the principal parts of the blade holder assembly.

Referring first to FIG. 1, the blade holder assembly of the present invention, generally designated 10, is adapted to mount a blade, generally designated 12, to the reciprocating plunger 14. It will be understood that the plunger 14 forms part of a power operated, reciprocating saw, often referred to as a Recipro saw or Saber saw. The plunger 14 is of cylindrical construction throughout substantially all of its length terminating at an outer end having a planar mounting surface 16 (FIG. 6). It will also be noted that this planar face includes a short cylindrical projection 18.

The blade 12 is of conventional construction and includes a planar cutting portion 20. The blade includes a series of cutting teeth (not shown) extending along the edge 20a of the blade and terminating at the outer end of the blade. The blade 12 also includes a co-planar mounting portion 22 which includes an aperture 24 for receiving the projection 18 formed on the plunger. The inner end of the blade is defined by an extension 26 having a height less than the height of the mounting portion 22 of the blade.

The blade holder assembly includes a housing 28 adapted to be secured to the plunger 14. In this respect, the housing 28 includes a bore 30 in coaxial alignment with a threaded bore 32 formed in the plunger 14. A fastener 34 threadingly engages the bore 32 for securing the housing 28 to the plunger with a wall 36 of the housing in engagement with a wall 38 formed on the plunger.

The housing, generally designated 28, includes upper and lower oppositely disposed walls 40 and 42, respectively. These two walls cooperate with an inner wall 44 of the housing and the planar surface 16 to define a cavity 46.

The walls 40, 42 have aligned openings 48 and 50, respectively, for receiving an actuator pin 54, the latter being attached at its upper end to an actuator knob or lever 56. The pin 54 has a flattened elongated surface 54a for receipt in a complimentary shaped bore formed in a cam block 60. Thus, it will be apparent that manual rotation of the knob 56 will impart rotation to the cam block which is mounted by the pin 54 in the cavity 46. The pin 54 includes a recess (not shown) at its lower end for receipt of a E-Ring 55 to secure the pin to the housing 28.

The cam block 60 includes an axially extending recess 62 for receiving one end 64a of a torsion spring 64. The other end 64b of the spring is received within a recess 66 (FIG. 2) formed in the cam block. It will be understood that the spring 64 tends to rotate the cam block 60 in a clockwise direction as seen in FIG. 6. A projection 68 (FIG. 6) on the cam block is arranged to abut a projection on the housing to limit clockwise rotation of the cam block when a blade is not in place.

The cam block 60 includes an arcuate cam face 70. This cam face is defined by a segment of an imaginary cylinder having its central axis parallel and offset with respect to the axis of rotation of the cam block. This can be understood by reference to FIG. 7 where 72 indicates the longitudinal central axis of the pin 54 which is the axis about which the cam block 60 rotates. (This axis is parallel with the plane of the blade and perpendicular to the longitudinal axis of the blade.) The longitudinal central axis of the imaginary cylinder containing the cam face 70 is indicated at 74 in FIG. 7. Thus, it is seen that the axis 74 is parallel and offset with respect to the axis 72. The cam face has a leading portion 70a and a trailing portion 70b. It will be appreciated that the leading portion of the cam surface is spaced from the axis 72 to an extent greater than the trailing portion of the cam surface.

Referring to FIG. 6, it will be understood that the blade 12 is quickly mounted in place by inserting the mounting portion 22 within the cavity 46. As the blade is pushed inwardly, the blade will tend to rotate the cam block 60 in a counterclockwise direction by reason of frictional engagement between the blade and the cam block. Preferably, the actuator 56 is rotated in a counterclockwise direction to facilitate inserting the blade fully in place with the blade aperture 24 receiving the projection 18 on the plunger 14. The torsion spring 64 will act to urge the cam block 60 in a clockwise direction for holding the blade in place.

Figure 7:
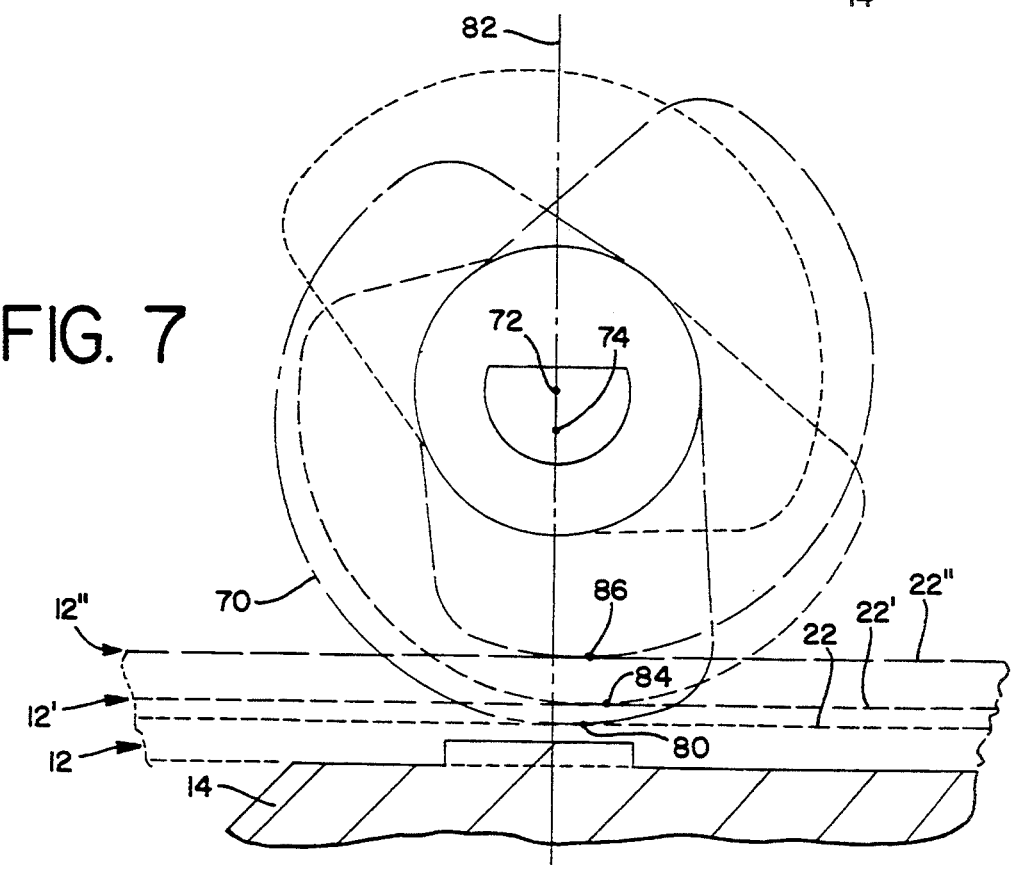
FIG. 7 is a somewhat diagrammatic view showing various positions of the cam block when engaging blades of varying thicknesses.

Referring to FIG. 7, it is seen that the cam face 70 establishes an axial line of contact 80 with the planar surface of the mounting portion 22 of the blade 12. This axial line of contact extends for substantially the height of the blade mounting portion 22 as the cam block 60 has a height substantially the same as the height of the blade mounting portion. This line of contact is of course parallel with the axis 72, i.e., the axis of rotation of the cam block. It is noted that the line of contact 80 is adjacent the leading portion of the cam face 70. It is also noted that the line of contact 80 occupies an over-center relationship with respect to a plane 82 which is perpendicular to the blade and which contains the axis 72. That is to say, this line of contact is spaced from the plane 82 in a direction toward the inner end of the blade. Thus, the cam face 70 will tend to increase the holding affect on the blade in response to a force tending to pull the blade out of the cavity 46, i.e., to the left as seen in FIG. 7.

The cam face 70 establishes an axial line of contact 84 with the planar face of the mounting portion 22' of a blade 12' which is thicker than the blade 12. Again, it is seen that the line of contact 84 occupies an over-center relationship with respect to the plane 82. The line of contact 84 is intermediate the leading and trailing portions of the cam face 70. The cam face 70 establishes an axial line of contact 86 with the planar surface of the mounting portion 22" of a blade 12" which has a thickness greater than the thickness of the blade 12'. It is noted that the line of contact 86 also occupies an over-center relationship with respect to the plane 82. It is also noted that the line of contact 86 is adjacent the trailing portion of the cam face 70. Thus, irrespective of the thickness of the blades, the over-center relationship is maintained thereby securely holding each blade in place notwithstanding forces tending to pull the blade away from the cavity 46.

While the invention has been described in connection with a preferred embodiment, it is not intended to limit the scope of the invention to the particular embodiment set forth, but on the contrary, it is intended to cover such alternatives, modifications and equivalents as may be included within the spirit and scope of the invention as defined by the appended claims. For example, one modification would include forming the planar mounting surface 16 and projection 18 as part of a wall which in turn would be port of the housing 28.

We claim:

1. A blade holder assembly for a blade having a planar cutting portion terminating at an outer end of the blade and a co-planar mounting portion terminating at an inner end of the blade, said assembly comprising:
   (a) first means on a plunger defining a planar surface for substantial co-extensive engagement with one side of the mounting portion of plural ones of said blades of varying thicknesses;
   (b) second means attached to the plunger and cooperating with said first means to define a cavity for receiving the mounting portion of the blade;
   (c) a one-piece cam block mounted in the cavity for rotation about an axis parallel with the plane of the blade and perpendicular to the longitudinal axis of the blade;
   (d) said cam block having an arcuate cam face defined by a segment of an imaginary cylinder having its central axis parallel and offset with respect to the axis of rotation of the cam block such that a leading portion of the cam surface is spaced from the axis of rotation of the cam block to an extent greater than a trailing portion of the cam surface;
   (e) the axial extent of said arcuate cam face being substantially the same as the height of the mounting portion of the blade;
   (f) wherein the cam face establishes respective plural axial lines of contact with the other side of the mounting portion of ones of said blades of varying thicknesses with (i) the line of contact for the thinnest blade being adjacent the leading portion of the cam face, (ii) the line of contact for the thickest blade being adjacent the trailing portion of the cam face, and (iii) the line of contact for a blade of intermediate thickness being intermediate said other lines of contact;
   (g) each of said lines of contact occupying an over-center relationship with respect to a plane perpendicular to the blade and containing said axis of rotation of the cam block, each of the lines of contact being spaced from said last-mentioned plane in a direction toward the inner end of the blade thereby to increase the holding effect of the cam block when the blade is subjected to a force tending to pull the blade out of the cavity; and
   (h) spring means mounted by said second means and engaged with said cam block for biasing the latter to rotate about its axis of rotation in a direction urging said arcuate cam face into engagement with said other side of the mounting portion of ones of said blades of varying thicknesses.

2. The blade holder assembly according to claim 1 wherein said second means is in the form of a housing.

3. The blade holder assembly according to claim 2 further defined by:
   (a) spring means mounted by said housing and engaged with said cam block for biasing the latter to rotate about its axis of rotation in a direction urging said arcuate cam face into engagement with the blade; and
   (b) manual actuating means attached to the cam block for rotating the same to disengage the cam face from the blade.

* * * * *